(12) United States Patent
Kim

(10) Patent No.: US 6,690,429 B1
(45) Date of Patent: Feb. 10, 2004

(54) DEVICE AND METHOD FOR PROCESSING COLOR SIGNAL

(75) Inventor: Sang Yeon Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/497,877

(22) Filed: Feb. 4, 2000

(30) Foreign Application Priority Data

Feb. 5, 1999 (KR) .......................................... 1999-3995

(51) Int. Cl.[7] .............................. H04N 5/208; H04N 5/21
(52) U.S. Cl. .................... 348/625; 348/630; 348/606; 348/252; 382/263; 382/266; 358/532
(58) Field of Search ................... 348/625, 627, 348/628, 629, 630, 606, 607, 252, 253; 382/263, 266, 274, 275, 167; 358/532, 447; H04N 5/208, 5/21

(56) References Cited

U.S. PATENT DOCUMENTS

| | | | | |
|---|---|---|---|---|
| 5,231,677 A | * | 7/1993 | Mita et al. ................... | 382/266 |
| 5,369,446 A | * | 11/1994 | Parker et al. ................ | 348/625 |
| 5,412,432 A | * | 5/1995 | Hong ......................... | 348/625 |
| 5,414,473 A | * | 5/1995 | Hong ......................... | 348/625 |
| 5,491,520 A | * | 2/1996 | Nozawa et al. .............. | 348/625 |
| 5,559,563 A | * | 9/1996 | Takahashi et al. ........... | 348/625 |
| 5,668,606 A | * | 9/1997 | Okamoto et al. ............ | 348/625 |
| 5,699,126 A | * | 12/1997 | Hong ......................... | 348/625 |
| 5,777,689 A | * | 7/1998 | Dunbar ....................... | 348/625 |
| 5,825,938 A | * | 10/1998 | Lange ......................... | 382/263 |
| 6,005,975 A | * | 12/1999 | Cheon ......................... | 382/199 |

* cited by examiner

Primary Examiner—Michael H. Lee
Assistant Examiner—Jean W. Désir
(74) Attorney, Agent, or Firm—Birch, Stewart, Kolasch & Birch, LLP

(57) ABSTRACT

A device and method for processing a color signal which can improve the sharpness of a color signal is disclosed. In the present invention, an edge of an image is detected and the detected edge is improved by making a sharp transition without over shoot or under shoot. Particularly, the color signal is delayed, and either a maximum or minimum value of the delayed signal is selectively output if the input signal is determined to be for a position at the edge region.

17 Claims, 3 Drawing Sheets

DEVICE AND METHOD FOR PROCESSING COLOR SIGNAL

BACKGROUND OF THE INVENTION

1. Field of the Invention

The present invention relates to a video compression and transmission system, and more particularly, to a device and method for processing a color signal.

2. Background of the Related Art

Generally, sharpness of an image depends on the contrast at the edge of the image. Particularly, an image is perceived to be sharper to human vision as the contrast at the edge of a first image and a second image becomes greater. In a video compression and transmission system, a luminance signal is passed through high pass frequency filtering or a second order derivative is added to an original signal to enhance the contrast at the edge of an image.

However, if a color signal is passed through high pass frequency filtering, the chroma is distorted at the image edge. Moreover, the high frequency component of the color signal is removed during the signal processing, resulting in a smooth image edge. Therefore, the color signal not only has a lower resolution than the luminance signal, but also has distortion at the image edge.

Particularly, the chroma distortion appears due to a slow change of the color signal at the edge, called color transient. Therefore, the color signal can be made sharper by improving the color transient using, for example, a process which converts the slowly changing edge to a rapidly changing edge. Similar to the processing of the luminance signal, a method in the related art proposes to add a second order derivative to an original signal to make the edge change rapidly. However, this may cause an over shoot or an under shoot at the edge. Therefore, the above method is not preferable due to chroma distortion from over shoot and under shoot.

SUMMARY OF THE INVENTION

Accordingly, an object of the present invention is to solve at least the problems and disadvantages of the related art.

An object of the present invention is to provide a device and method for processing a color signal which results in a sharp image.

Additional advantages, objects and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a device for processing a color signal includes a maximum value generator for delaying an input color signal by N successive taps, selecting and outputting a maximum value from the delayed signal, where N is a natural number; an original signal generator for delaying the input color signal by (N+1)/2 taps; a minimum value generator for delaying the input color signal by N successive taps, selecting and outputting a minimum value from the delayed signal; a selector for selecting and outputting one of the maximum value, the original color signal or the minimum value; and a selection controller for generating a selecting signal from the maximum value, the original color signal and the minimum value.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Reference will now be made in detail to the preferred embodiments of the present invention, examples of which are illustrated in the accompanying drawings. Generally, in the present invention, a color signal is processed through N tap maximum/minimum value filtering to determine if the signal is for an image edge. Thereafter, an average of the results of the two filterings is compared to an original signal if the signal is determined to be for an image edge, and one of the two filtering results is output depending upon results of the comparison.

Figure 1:
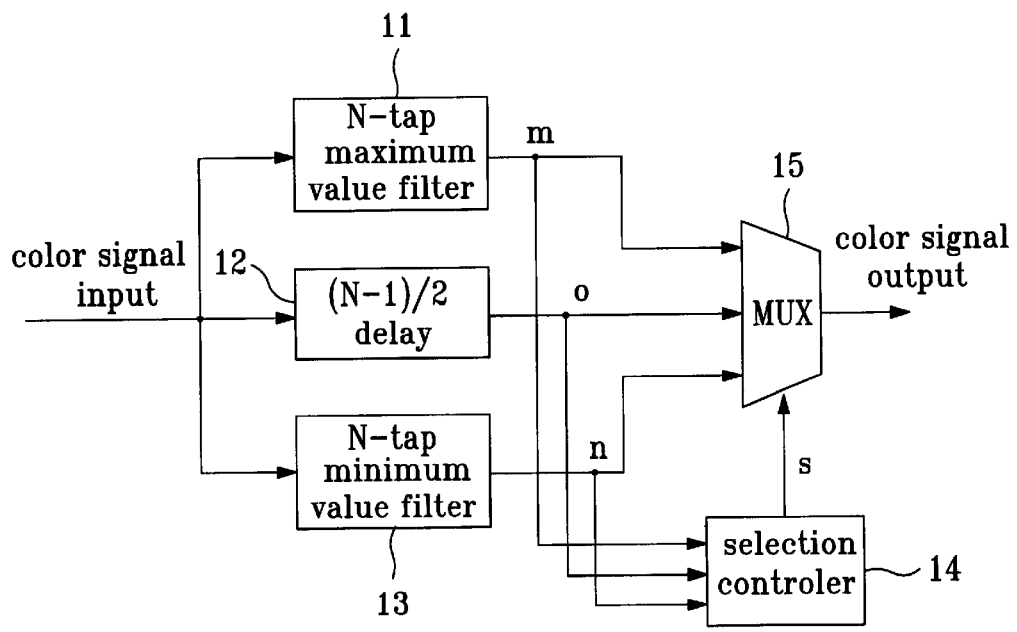
FIG. 1 is a block diagram of a device for processing a color signal in accordance with the present invention.

FIG. 1 is a block diagram of a device for processing a color signal in accordance with the present invention, including a N tap maximum value filter 11 which receives an input color signal, delays the input color signal by N taps, and outputs a maximum value m from among the delayed input color signal; a delay 12 which delays the input color signal by (N−1)/2 taps; an N tap minimum value filter 13 which also receives the input color signal, delays the input color signal by N taps and outputs a minimum value n from among the delayed input color signal; a selector 15 which selects and outputs one of the maximum value m, an original color signal o, or the minimum value n; and a selection controller 14 which generates a selection signal based upon the maximum value m, the original color signal o, and the minimum value n and outputs the selection signal to the selector 15.

Figure 2:
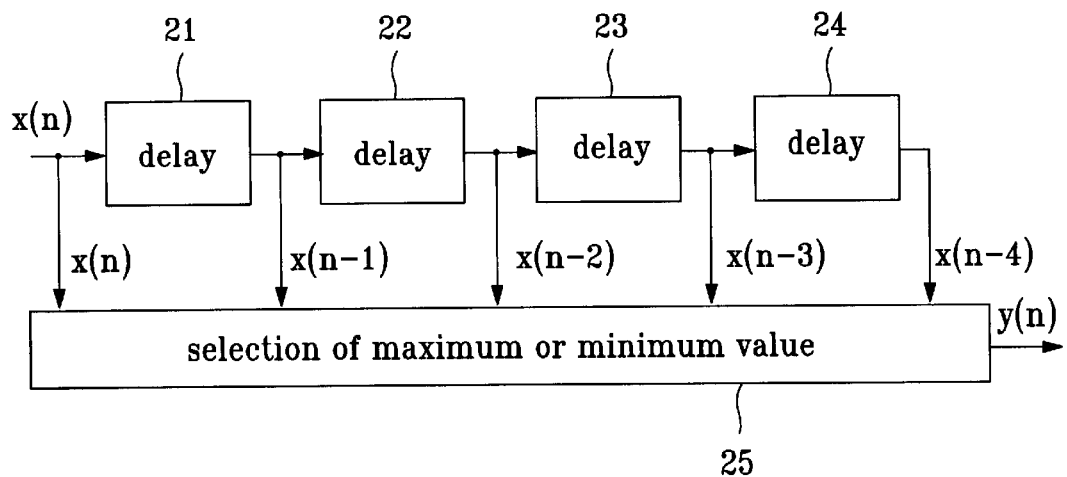
FIG. 2 is a block diagram of tile maximum/maximum value filters shown in FIG. 1.

In the above embodiment, the selector 15 may be a multiplexer. Also, the number of taps N is an odd number, preferably greater than nine. Moreover, the maximum value filter 11 and the minimum value filter 13 have identical systems, except the maximum value filter 11 outputs a maximum value and the minimum value filter outputs a minimum value. FIG. 2 shows a block diagram of the maximum/minimum value filters, having five taps, i.e. four delays, as an example.

Referring to FIG. 2, the filter includes four delays 21~24 which successively delays the input color signal and a selector 25 which outputs one of the input color signal x(n) or delayed input color signals x(n~1)~x(n~4). If the filter is a maximum value filter, the selector 25 outputs the maximum value m among the input color signals. Similarly, if the filter is a minimum value filter, the selector 25 outputs a minimum value n among the input color signals.

Figure 3:
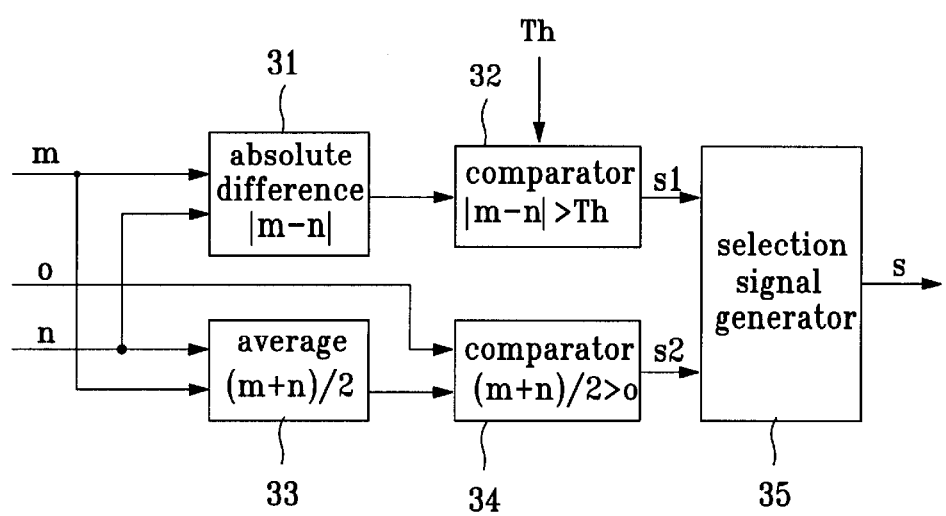
FIG. 3 is a block diagram of the selection controller shown in FIG. 1.

FIG. 3 shows a block diagram of the selection controller 14 of FIG. 1, including an absolute difference calculator 31 which takes an absolute value of the difference between the maximum value m and the minimum value n; a first comparator 32 which compares the output from the absolute value calculator 31 to a threshold value Th; an average calculator 33 which calculates an average of the maximum value m and the minimum value n; a second comparator 34 which compares the output of the average calculator 33 to the original color signal o; and a selection signal generator 35 which generates a selection signal s based upon the results of the first and second comparators 32 and 34.

In operation, an input color signal is processed through the N tap maximum value filter 11 and tile N tap minimum value filter 13. Namely, the input color signal is respectively delayed in parallel through the delays, i.e. four in the above example, in each of the maximum and minimum value filters 11 and 13. The selector 25 for the N-tap maximum value detector 11 detects the maximum value m from the input color signal x(n) and the delayed signals x(n-1)~x(n-4). Similarly, the selector 25 for the N-tap minimum value detector 13 detects the minimum value n from the input color signal x(n) and the delayed signals x(n-1)~x(n-4). The detected maximum and minimum values m and n, and the original signal delayed by (N-1)/2 taps are output to the selector 15. The input signal is delayed by (N-1)/2 because the maximum and minimum values output by the N-tap maximum/minimum filter 11 and 13 are filtered values resulting from a sample delayed by (N-1)/2.

The selector 15 selects one of the maximum value m, the original color signal o, or the minimum value n in response to the selection signal from the selection controller 14. Particularly, the absolute difference calculator 31 of the selection controller 14 calculates a difference m-n between the maximum value m and the minimum value n, takes an absolute value |m-n| of the difference, and forwards the calculated value to the first comparator 32. The first comparator 32 compares the absolute difference value to the threshold value Th.

Generally, the maximum value m and the minimum value n would have a relatively large difference if the input signal is for an edge region. Therefore, if the absolute difference value of the maximum value m and the minimum value n is greater than the threshold value Th, the present input signal is determined to fall on the edge region. Here, the threshold value Th is a predetermined value that is set depending upon the degree of sharpness of image desired. Depending upon the comparison, the comparator 32 outputs a signal s1 to the selection signal generator 35. Also, the average calculator 33 calculates an average value (m+n)/2 of the maximum value m and the minimum value n, and forwards the average value to the second comparator 34. The comparator compares the average value to the original color signal o, and forwards a signal s2 depending upon the result to the selecting signal generator 35.

According to s1 and s2, the section signal generator 35 generates a selection signal s as shown in Table 1, where s1 is true if the absolute difference value is greater than Th and s2 is true if the average value is greater than the original signal.

TABLE 1

| s1 | s2 | s | selector 15 output |
|---|---|---|---|
| false | x(don't care) | 1 | original signal o |
| true | false | 0 | maximum value m |
| true | true | 2 | minimum value n |

Particularly, if the absolute difference value is smaller than the threshold value Th, the present position is determined not to be in the edge region. Thus, the selection signal generator 35 generates a selection signal s so that the original signal o is output, regardless of the output of the second comparator 34. On the other hand, if the absolute difference value is greater than the threshold value Th, the present position is determined to be in the edge region. Accordingly, the selection signal generator 35 generates a selection signal s so that either the maximum value m or the minimum value n is output depending to the output of the second comparator 34. Namely, the selection signal s is generated such that the maximum value m is output if the average value is greater than the original color signal o. Otherwise, the minimum value n is output.

Figure 4A:
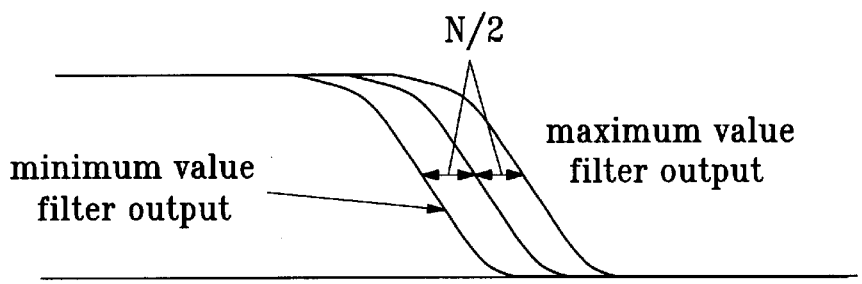
FIGS. 4A~4C illustrate effects of applying the present invention.
Figure 4B:
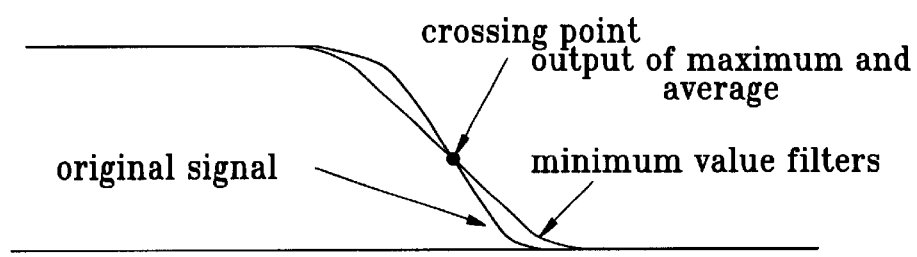
Figure 4C:
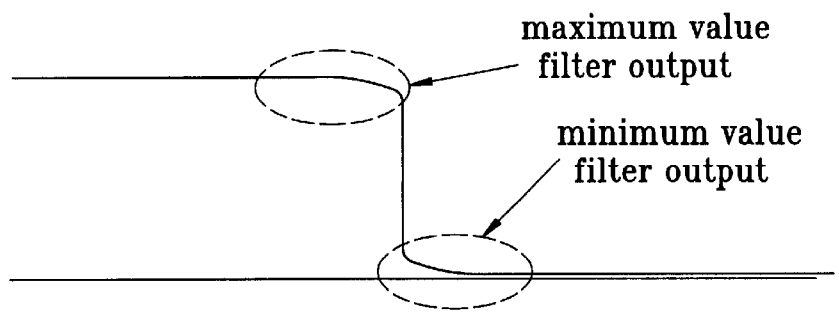

FIGS. 4A–4C show the effects of applying the present invention. FIG. 4A illustrates an edge form of the input signal and waveforms obtained through maximum and minimum filtering. As shown, the filtered values of the maximum/minimum filter at the edge of an image is a uniformly decreasing or increasing signal having a form of the original signal shifted to the right or left by an amount equivalent to half the number of taps N/2. FIG. 4B illustrates a crossing point of the original signal and the average signal of the maximum/minimum filtered values. By selecting the maximum value m to the left of the crossing point, i.e. when (m+n)/2>o, and by selecting the minimum value n otherwise, a sharp edge may be obtained as shown in FIG. 4C.

Furthermore, because the present invention permits separate calculation of an image in the horizontal and vertical directions, the implementation cost may be reduced by applying the present invention in the horizontal and vertical directions as one system. Also, the present invention is applicable to different products, such as a digital TV, a camcorder, a digital audio/video cassette recorder (DVCR) and a digital versatile disk(DVD) player, to thereby enhance the competitiveness of the products.

As explained, the device and method for processing a color signal of the present invention results in a sharper color picture. The chroma state is improved without causing unnecessary chroma distortion because an improvement is made for an edge region after detecting the edge region. Particularly, a sharp transition at the edge region is made without causing an over shoot or under shoot, thus improving a sharp color picture without distortion of chroma. Finally, the horizontal and vertical direction processing in sequence using one circuit permits low implementation costs.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A device for processing a color signal comprising:
   a maximum value generator which receives an input color signal, delays the input color signal by N taps, and outputs a maximum value m from among the delayed input color signal;
   a delay which delays said input color signal by (N-1)/2 taps and outputs an original value o;
   a minimum value filter which receives the input color signal, delays the input color signal by N taps and outputs a minimum value n from among the delayed input color signal;
   a selector which selects and outputs one of the maximum value m, an original color signal o, or the minimum value n, according to a selection signal s; and a selection controller which generates the selection signal s based upon comparisons between relationships of the maximum value m, the original color signal o, and the minimum value n with respect to each other, and further comparisons between each of those relationships to the same set value, which is a predetermined threshold value Th, and outputs the selection signal s to the selector.

2. A device of claim 1, wherein the maximum value generator includes:

a delay unit having a plurality of delays connected in parallel which receives the input color signal, delays the input color signal by N taps and outputs delayed input color signals; and a selector which receives the input color signal and the delayed input color signals from the delay unit, said selector selecting and outputting the maximum value m from among the input color signal and the delayed color signals.

3. A device of claim 1, wherein the minimum value generator includes:

a delay unit having a plurality of delays connected in parallel which receives the input color signal, delays the input color signal by N taps and outputs delayed input color signal; and a selector which receives the input color signal and the delayed input color signals from the delay unit, said selector selecting and outputting the minimum value m from among the input color signal and the delayed color signals.

4. The device of claim 1, wherein the selection controller includes:

an absolute difference calculator which takes an absolute value of the difference between the maximum value m and the minimum value n to output an absolute difference value;

a first comparator which compares the absolute difference value to the threshold value Th;

an average calculator which calculates an average of the maximum value m and the minimum value n to output an average value;

a second comparator which compares the average value to the original color signal o; and a selection signal generator which generates the selection signal s based upon the results of the first and second comparators.

5. A device of claim 4, wherein the selection signal generator generates and outputs the selection signal s so that the original signal o is output by the selector if the absolute difference value is smaller than the threshold value Th.

6. A device of claim 4, wherein the selection signal generator generates and outputs the selecting signal s so that the maximum value m is output by the selector, if the absolute difference value is not smaller than the threshold value Th and if the average value is greater than the original color signal o.

7. A device of claim 4, wherein the selection signal generator generates and outputs the selecting signal s so that the minimum value n is output by the selector, if the absolute difference value is not smaller than the threshold value Th and if the average value is not greater than the original color signal o.

8. A device of claim 1, wherein the selector is a multiplexer.

9. A device of claim 1, wherein the number of taps N utilized is at least nine.

10. A method for processing a color signal comprising:

(a1) receiving an input color signal, delaying the input color signal by N taps, and outputting a value M from among the delayed input color signal;

(b1) delaying said input color signal by (N−1)/2 taps and outputting an original value o;

(c1) receiving the input color signal, delaying the input color signal by N taps and outputting a minimum value n from among the delayed input color signal;

(d1) selecting and outputting one of the maximum value m, an original color signal o, or the minimum value n, according to a selection signal s; and (e1) generating and outputting the selection signal s based upon the maximum value m, the original color signal o, and the minimum value n.

11. A method of claim 10, wherein (a1) comprises:

delaying the input color signal by N taps utilizing a plurality of delays connected in parallel and outputting delayed input color signals; and selecting and outputting the maximum value m from among the input color signal and the delayed color signals.

12. A method of claim 10, wherein (c1) comprises:

delaying the input color signal by N taps utilizing a plurality of delays connected in parallel and outputting delayed input color signals; and selecting and outputting the minimum value n from among the input color signal and the delayed color signals.

13. A method of claim 10, wherein (e1) comprises:

(a2) calculating an absolute value of the difference between the maximum value m and the minimum value n to output an absolute difference value;

(b2) comparing the absolute difference value to a threshold value Th;

(c2) calculating an average of the maximum value m and the minimum value n to output an average value;

(d2) comparing the average value to the original color signal o; and (e2) generating the selection signal s based upon the results of (b2) and (d2).

14. A method of claim 13, wherein (e2), generating the selection signal s so that the original signal o is output in (d1), if the absolute difference value is smaller than the threshold value Th.

15. A method of claim 13, wherein in (e2), generating the selecting signal s so that the maximum value m is output in (d1), if the absolute difference value is not smaller than the threshold value Th and if the average value is greater than the original color signal o.

16. A method of claim 13, wherein in (e2), generating the selecting signal s so that the minimum value n is output in (d1), if the absolute difference value is not smaller than the threshold value Th and if the average value is not greater than the original color signal o.

17. A method of claim 10, wherein the number of taps N utilized is at least nine.

* * * * *